Patented Oct. 23, 1934

1,977,718

UNITED STATES PATENT OFFICE 1,977,718

MANUFACTURE OF ALIPHATIC COMPOUNDS

Henry Dreyfus, London, England

No Drawing. Application July 21, 1930, Serial No. 469,651. In Great Britain July 24, 1929

9 Claims. (Cl. 260—156)

This invention relates to the manufacture of aliphatic compounds and particularly of oxygenated organic compounds from oxides of carbon and hydrogen, or alternatively from compounds synthesized therefrom, e. g. methyl alcohol, mixed or not with oxides of carbon and/or hydrogen.

In a series of researches upon the production of organic compounds by the hydrogenation of oxides of carbon I have found that valuable products are obtainable by utilizing catalysts consisting of or containing the compounds of the metals of Groups 1 and 2 of the Periodic System with the oxy acids of certain elements of the 2nd, 3rd, 4th and 5th groups namely those forming non-gaseous oxides. In particular I have found that the alkali or alkaline earth and copper borates, aluminates, zincates, silicates and phosphates are good catalysts for the production of oxygenated organic compounds from oxides of carbon and hydrogen. The invention is, however, not limited to these particular salts but comprises also the use of alkali or alkaline earth or copper plumbates, stannates, titanates, tantalates, niobates or vanadates or other salts of oxy acids of the elements of the 2nd, 3rd, 4th and 5th groups of the Periodic System. Furthermore other metals of Groups 1 and 2 of the Periodic System may be used as the basic radicle. Initially the basic radicle, e. g. sodium, potassium, calcium, barium, magnesium or copper, may be present in the form of a salt of any of the oxy acids referred to above, for example in the form of ortho, pyro or meta phosphates, or in the form of phosphites or hypophosphites or in the form of ortho or meta silicates.

The compounds may contain the basic and the acid radicles in any convenient proportion. An excess of basic radicle over the acid radicle or of acid radicle over basic radicle sometimes materially alters the direction of the reaction. Generally excess of the acid radicle tends to produce products of higher degree of oxidation than alcohols, such for example as acids, whereas excess of the basic radicle tends to confine the reaction to the production of aliphatic alcohols. The proportion may for example be one molecular proportion of basic radicle to two proportions of acid radicle, or equal molecular proportions may be used, or one molecular proportion of basic radicle may be used to two molecular proportion of acid radicle. Furthermore intermediate proportions or proportions outside those indicated may be used. The excess of basic or acid radicle may be present in a combined state, as for example in a basic or acid salt, or the excess of the base or of the acid may be present merely in admixture or association with the normal salt.

Copper containing catalysts are advantageously used in conjunction with compounds of the alkalies or alkaline earth metals, for instance compounds of the oxy acids referred to above. Here again the relative proportion of alkali or alkaline earth metal to copper may be varied as desired. For example proportions of 1:2, 1:1 or 2:1 molecules of alkali or alkaline earth metal to copper may be employed.

The catalysts of the present invention may be used alone or in admixture or chemical combination with each other and/or in admixture or chemical combination, e. g. as double salts, with other metals, for example aluminium, chromium, manganese, molybdenum, vanadium, tungsten or uranium or with two or more of such other metals. The other metals are preferably present in the form of compounds and may be present in the form of compounds of the oxy acids previously referred to. If used in such form they may be present as double salts with the metals, the use of which is particularly contemplated by the present invention.

The present invention is not restricted to the use of the metals of Groups 1 and 2 of the Periodic System in the form of simple borates, aluminates, zincates, silicates or phosphates or other salts of oxy acids of the 2nd, 3rd, 4th and 5th groups of the Periodic System. It further comprises their use in the form of complex salts containing these oxy acids, for example in the form of boro-silicates, boro-tungstates, titano-silicates, phospho-molybdates, phospho-tungstates, phospho-vanadates, silico-molybdates, silico-tungstates, phospho-tungsto-silicates, phospho-molybdo-silicates, phospho-tungsto-molybdates etc.

Reacting gases of varying composition may be employed for the purpose of the present invention, for example reacting gases containing two or more volumes of carbon monoxide or dioxide to one volume of hydrogen, or equal volumes of the oxide of carbon and of hydrogen, or one volume of carbon monoxide or dioxide to two or more volumes of hydrogen, or mixtures containing intermediate proportions. Mixtures of carbon monoxide and dioxide may of course be employed. It is not necessary to utilize pure reacting gases since mixtures containing the desired reacting gases may be employed, for example coke oven gas, producer gas, water gas and the like. The proportions of reacting gases in such industrial gases may be adjusted, if desired, by suitable additions. The reacting gases may contain inert gases, such as nitrogen, or they may contain hydrocarbons, for example methane or other paraffins. The methane or other hydrocarbons may be used as an addition to the reacting gases or may be used wholly or partly in the place of the hydrogen, this modification forming an important feature of the present invention. Steam may moreover be used in addition to or wholly or partly in place of the oxide of carbon.

The actual hydrogenation of the oxides of carbon may be conducted at any suitable temperatures, for example temperatures ranging from 200 to 250° C. to 400 or 500 or even 600° C. or more, but preferably the temperatures used are between 250° and 400° C. and particularly 250° to 300° to 350° C. The reaction is preferably carried out under pressure, for example pressures of 50, 100, 200, 300 or 500 atmospheres or more.

According to a modification of the invention instead of employing oxides of carbon in conjunction with hydrogen the oxygenated organic compounds obtained from such a synthesis, for example methyl or ethyl alcohol or other alcohols, may be used. In this modification of the invention methyl alcohol, for example, can be converted into compounds of higher order, for example into ethyl alcohol, acetaldehyde, acetic acid, etc. The alcohols or other compounds may be used alone or in conjunction with carbon monoxide, carbon dioxide and/or hydrogen. The use of hydrogen generally tends to produce higher alcohols, e. g. ethyl alcohol, propyl alcohol and higher alcohols to the exclusion of compounds of a higher order of oxidation, e. g. aldehydes, acids, ketones, whilst the use of carbon dioxide is effective in promoting the formation of such bodies of higher order of oxidation. In cases, however, where the catalyst contains excess or substantial excess of acid radicle over basic radicle the reaction tends to produce products of a higher order of oxidation, e. g. acids and aldehydes even in the presence of hydrogen. The vapours of the methyl alcohol or other compound may be passed with or without carbon monoxide or dioxide and with or without hydrogen over the catalysts of the present invention contained in a heated reaction vessel. The methyl or ethyl alcohol or other compound may furthermore be prepared in a preliminary operation continuously with its use according to the present invention. For such continuous operation mixtures of carbon monoxide or dioxide and hydrogen or gases containing them may, for example, be passed through the reaction chamber containing zinc oxide or basic zinc chromate or other catalysts or catalyst mixtures capable of producing the methyl alcohol or other compound, and the resulting gases or vapours passed directly over the catalysts or catalyst mixtures of the present invention. Instead of using methyl alcohol or other compound obtainable from carbon monoxide or dioxide and hydrogen, compounds capable of yielding the methyl alcohol or other compound may be used, for example methyl formate, methyl acetate or dimethyl ether.

The reactions according to the present invention may be effected in any suitable reaction chambers or vessels, for example copper vessels or copper lined vessels or steel vessels, and particularly vessels made of steel containing molybdenum, tungsten, manganese, cobalt, nickel or the like.

The following examples serve to illustrate convenient forms of execution of the invention, it being understood that they are given only by way of illustration and are in no way limitative.

*Example 1*

Water gas containing about 30% of carbon monoxide and 65% hydrogen is passed under a pressure of between 50 and 150 atmospheres in contact with a catalyst composed of a mixture of copper meta phosphate and sodium phosphate (e.g. containing about 5–10% sodium phosphate) heated to a temperature between 250° and 350° C.

There results a copious yield of ethanol and other higher aliphatic alcohols.

If in place of this catalyst there is employed a catalyst containing an excess of acid radicle over basic radicle and containing no alkali salt, e. g. a catalyst composed of a mixture of 1 molecular equivalent of copper meta phosphate and 1 molecular equivalent of phosphoric acid, the reaction gases are largely or entirely converted to compounds of a higher degree of oxidation including acetic acid, methyl acetate, acetaldehyde and higher acids and aldehydes.

*Example 2*

Methanol or a mixture of methanol and carbon monoxide are passed under a pressure of between 100 and 200 atmospheres in contact with copper meta borate heated to a temperature between 250° and 350° C.

There results a copious yield of ethanol and other higher aliphatic alcohols, together with aldehydes, acids, and ketones.

If the carbon monoxide is wholly or partly replaced by hydrogen and particularly if the carbon monoxide is wholly replaced, the reaction products are substantially free from acids, aldehydes and ketones. If, however, the carbon monoxide is replaced by carbon dioxide, formation of the compounds of a higher order of oxidation is materially increased, whilst if, besides replacing the carbon monoxide with carbon dioxide, there is employed a catalyst containing an excess of acid radicle over basic radicle, e.g. a mixture of 1 molecular equivalent of copper meta borate and 1 molecular equivalent of phosphoric acid, the reaction product consists largely or entirely of acetic acid, methyl acetate, acetaldehyde and higher acids, aldehydes and esters.

By the term "reduction of carbon monoxide" I intend to refer to those processes of the type in which oxygenated organic compounds are formed by causing carbon monoxide to react with hydrogen or with other compounds, such as methanol or methyl formate, which may be formed by the reduction of carbon monoxide with hydrogen.

What I claim and desire to secure by Letters Patent is:—

1. Process for the synthesis of oxygenated organic compounds by the reduction of carbon monoxide, characterized by the employment as catalyst of a phosphate of a metal of Groups 1–2 of the Periodic System.

2. Process for the synthesis of oxygenated organic compounds, which comprises subjecting a mixture of carbon monoxide and hydrogen to the action of elevated temperatures and pressures in presence of a phosphate of a metal or Groups 1-2 of the Periodic System.

3. Process for the synthesis of oxygenated organic compounds, which comprises subjecting water gas to a temperature between 250° and 400° C. and a pressure between 50 and 150 atmospheres in presence of a catalyst mass composed of a mixture of copper metaphosphate and sodium phosphate.

4. Process for the synthesis of oxygenated organic compounds from oxygenated organic compounds of a lower order that can be obtained by reaction between oxides of carbon and hydrogen, characterized by the employment as catalyst of a phosphate of a metal of Groups 1-2 of the Periodic System.

5. Process for the synthesis of oxygenated organic compounds from oxygenated organic compounds of a lower order that can be obtained by reaction between oxides of carbon and hydrogen, characterized by the employment as catalyst of a silicate of a metal of Groups 1-2 of the Periodic System.

6. Process for the synthesis of oxygenated organic compounds, which comprises subjecting an oxygenated organic compound of a lower order that can be obtained by reaction between oxides of carbon and hydrogen in admixture with carbon monoxide to the action of elevated temperatures and pressures, in presence of a phosphate of a metal of Groups 1-2 of the Periodic System.

7. Process for the synthesis of oxygenated organic compounds, which comprises subjecting an oxygenated organic compound of a lower order that can be obtained by reaction between oxides of carbon and hydrogen in admixture with carbon monoxide to the action of elevated temperatures and pressures, in presence of a silicate of a metal of Groups 1-2 of the Periodic System.

8. Process for the synthesis of oxygenated organic compounds which comprises subjecting a mixture of carbon monoxide and hydrogen to the action of elevated temperatures and pressures in the presence of a compound of the metal of Groups 1-2 of the Periodic System with an oxy acid of a true non-metal of Groups 4-5 of the Periodic System, which non-metal forms a non-gaseous oxide.

9. A process for the synthesis of oxygenated organic compounds which comprises subjecting a mixture of carbon monoxide and hydrogen to a temperature between 250° and 400° C and a pressure of at least 50 atmospheres, in the presence of a compound of the metal of Groups 1-2 of the Periodic System with an oxy acid of a true non-metal of Groups 4-5 of the Periodic System, which non-metal forms a non-gaseous oxide.

HENRY DREYFUS.